United States Patent [19]

Worback

[11] 4,007,845

[45] Feb. 15, 1977

[54] SWING MECHANISM

[75] Inventor: David L. Worback, Highland, Mich.

[73] Assignee: Massey-Ferguson Inc., Detroit, Mich.

[22] Filed: Mar. 17, 1975

[21] Appl. No.: 559,271

[52] U.S. Cl. .............................. 214/138 D; 91/420; 91/454

[51] Int. Cl.[2] .............................................. G02F 3/32

[58] Field of Search .................... 214/138 R, 138 D; 91/420, 454

[56] References Cited

UNITED STATES PATENTS

| | | | |
|---|---|---|---|
| 3,033,170 | 5/1962 | Norton et al. | 91/454 |
| 3,047,171 | 7/1962 | Long | 214/138 D |
| 3,630,120 | 12/1971 | Carlson | 214/138 D |
| 3,795,178 | 3/1974 | Roche | 91/420 |
| 3,872,985 | 3/1975 | Short | 214/138 D |

*Primary Examiner*—Frank E. Werner
*Assistant Examiner*—Ross Weaver
*Attorney, Agent, or Firm*—Thomas P. Lewandowski

[57] ABSTRACT

Backhoe swing apparatus including a backhoe swing bracket for supporting a backhoe for side-to-side swinging movement. A pair of hydraulic actuators are connected with the swing bracket for actuating the swing bracket in opposite directions. The hydraulic actuators are of the piston and cylinder type, and are controlled by a hydraulic system including a pair of hydraulic lines for conducting hydraulic fluid to and from each of the hydraulic actuators. A normally open pressure reducing valve in one of the hydraulic lines is operable to control pressure to one of the actuators to actuate the swing bracket in one direction and to thereby limit the pressure of fluid flowing to the actuator. Simultaneously, flow from the other actuator through the other hydraulic line is controlled by a first normally closed metering valve, which opens a permit such flow only when a predetermined minimum pressure exists in the other hydraulic line. A second normally closed metering valve controls flow of hydraulic fluid from the first hydraulic actuator when the swing bracket swings in the opposite direction, and permits such flow only when a predetermined minimum pressure exists in the other line.

22 Claims, 2 Drawing Figures

SWING MECHANISM

Figure 1:
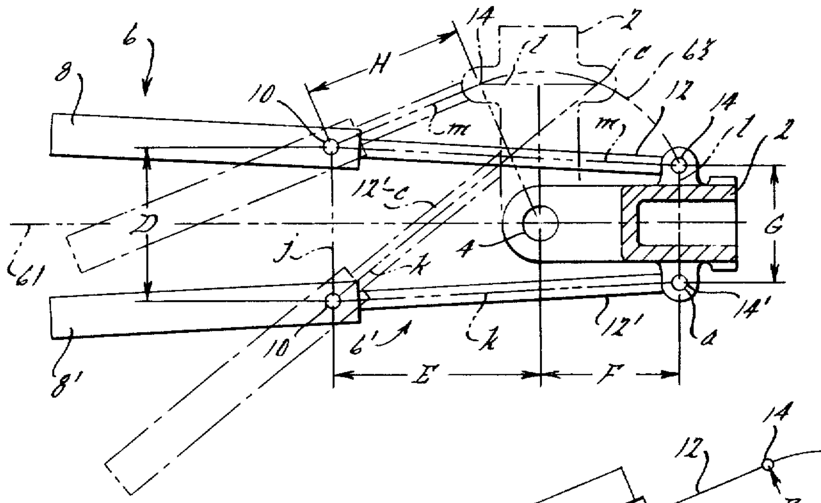

This invention relates generally to backhoes, and is particularly concerned with apparatus for controlling the side-to-side swinging movement of the backhoe boom.

In earthworking equipment of the type commonly referred to as "backhoes", an excavating bucket is pivotally mounted on one end of a dipper stick, the other end of the dipper stick being pivotally mounted on the end of a boom. The boom is, in turn, mounted on a swing unit in such a manner that the boom can be actuated by the operator to swing from side to side to position the boom at a desired location in a horizontal path for a digging operation. Generally, presently manufactured equipment of this type includes complex hydraulic circuitry in the swing mechanism for controlling the side-to-side swinging movement of the boom. Examples of prior art backhoes are disclosed in U.S. Pat. Nos. 3,263,837; 3,412,880; and 3,815,766.

An object of this invention is to provide a backhoe swing mechanism wherein the swing bracket for supporting the backhoe boom is hydraulically actuated to swing in opposite directions in such a manner that the hydraulic actuating pressures are closely controlled to prevent overrunning of the swing bracket and to closely control the position of the swing bracket and to closely control the position of the seing bracket by selective energization and de-energization of the hydraulic circuitry.

A further object is to provide backhoe swing apparatus wherein a swing bracket for supporting a backhoe boom is actuated by energization and de-energization of the hydraulic circuit to swing from side-to-side to a desired position in a horizontal path, and wherein the pressures in the hydraulic circuitry ae controlled between minimum and maximum limits to provide fine control of the position of the swing bracket, and to prevent excessive pressures in the hydraulic system.

In carrying out the foregoing, and other objects, backhoe swing apparatus according to the present invention includes a swing bracket support member with a backhoe swing bracket mounted thereon for side-to-side swinging movement. Hydraulic power means in the form of a pair of extensible and contractable hydraulic actuators of the piston and cylinder type is connected with the swing bracket, the hydraulic actuators being connected on opposite sides of the swing bracket support member such that the swing bracket swings in one direction when one of the actuators extends and the other motor contracts, and vice versa. A hydraulic system controls flow to and from the hydraulic power means and includes a normally open pressure reducing valve, which controls flow of hydraulic fluid to the power means through one hydraulic line to actuate the swing bracket in one direction, and first and second metering valves. The first metering valve is operable to control flow of hydraulic fluid from the power means through a hydraulic line and prevents such flow unless a predetermined minimum pressure exists in the line, during the swinging movement of the swing bracket in one direction. The second metering valve is operable to control flow of hydraulic fluid from the power means at a predetermined minimum pressure during swinging movement of the swing bracket in the opposite direction. Check valves are provided in the circuit to control the direction of flow to various hydraulic lines in the circuitry, and the pressure reducing and metering valves are pilot pressure operated so that the valves respond to pressures sensed through pilot lines from various hydraulic lines in the circuit. The metering valves also function as pressure relief valves when the circuit is de-energized to prevent excessive pressures in the hydraulic system.

The hydraulic actuators cooperate with the swing bracket and swing bracket support member to provide a quadrilateral control linkage that positions the swing bracket angularly with respect to the swing bracket support member in accordance with the relative lengths of the actuators.

Other objects, advantages and features of the invention will become apparent from the following description taken in connection with the accompanying drawings.

Figure 2:
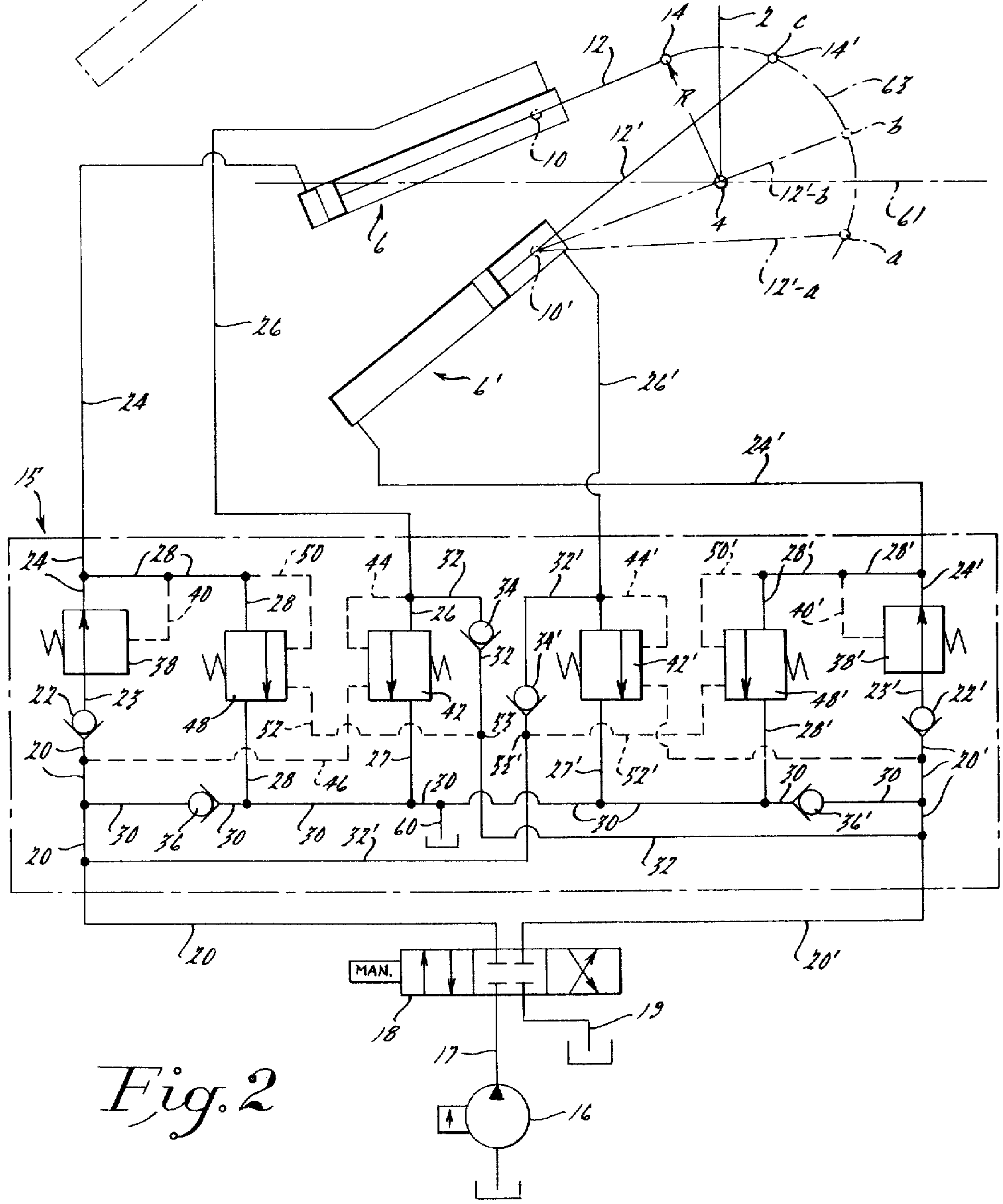

FIG. 1 is a plan view, partially in section, of a backhoe swing bracket and power means for actuating the swing bracket; and FIG. 2 is a schematic diagram illustrating the hydraulic circuitry according to a preferred embodiment of the invention.

In FIG. 1, reference numeral 2 designates a backhoe swing bracket pivotally supported on a swing bracket support member 4 for side-to-side swinging movement about the axis of the support member 4. The swing bracket 2 supports a backhoe boom assembly (not shown).

The swing bracket 2 is actuated to swing in opposite directions about the axis of support member 4 by hydraulic power means in the form of a pair of extensible and contractable hydraulic actuators 6 and 6′ of the piston and cylinder type. The hydraulic actuator 6 includes a cylinder 8 pivotally supported by a pin 10 on a support member (not shown), and a piston slidably received in the cylinder 8 having a rod 12 pivotally connected by pin 14 to the swing bracket 2. The actuator 6′ is identical to the actuator 6, the cylinder end of the actuator 6′ being pivotally connected to a support member by pin 10′, and the rod end of actuator 6′ being pivotally connected to the swing bracket 2 by a pin 14′ located on the opposite side of the swing bracket 2 from pin 14. Extension of actuator 6′ from the full line position of FIG. 1 to the phantom line position, along with simultaneous contraction of actuator 6, causes the swing bracket to swing or pivot counterclockwise about the axis of support member 4, the extreme counterclockwise position of the swing bracket 2 being illustrated in phantom lines in FIG. 1. Conversely, extension of actuator 6, accompanied by contraction of actuator 6′, causes clockwise swinging or pivotal movement of the swing bracket 2, the extreme clockwise position of the swing bracket being located 180° from the phantom line position shown in FIG. 1.

Starting from the full line position of FIG. 1, flow of hydraulic fluid to the head end of actuator 6 — that is, the end of actuator 6 on the side of pin 10 opposite pin 14 — causes extension of actuator 6, which results in clockwise swinging movement of the swing bracket 2, and contraction of actuator 6′. In the full line position of FIG. 1, when hydraulic fluid flows to the head end of actuator 6, hydraulic fluid flows from the rod end of actuator 6 and from the head end of actuator6′; conversely, flow of hydraulic fluid to the head end of actuator 6′ results in counterclockwise movement of the swing bracket 2 and flow of fluid from the rod end of actuator 6' and from the head end of actuator 6.

As the swing bracket 2 moves counterclockwise from the full line position of FIG. 1 to the phantom line position, rod 12' (or the line of action of actuator 6') moves across the axis of support member 4 to an "overcenter" position with respect thereto, an overcenter position of actuator 6' being illustrated in the phantom line position of FIG. 1 and in the full line position of FIG. 2. As the actuator 6' extends during the counterclockwise movement of the swing bracket 2, it acts as a motor until it moves overcenter with respect to the axis of support member 4, after which it is contracted by the swing bracket against the pressure at its head end and thus acts as a pump. Conversely, during clockwise movement of the swing bracket, actuator 6 functions as a motor until it moves overcenter with respect to the axis of support member 4, after which it is contracted by the continued swing bracket movement and functions as a pump. When actuator 6' is overcenter, and hence in a pump mode of operation, actuator 6 is still in a motor mode of operation, and vice versa.

The flow of hydraulic fluid to and from the hydraulic power means 6, 6' is controlled by a hydraulic system indicated collectively by reference numeral 15 in Fig. 2. A source of hydraulic pressure is provided by a main supply line 17 connected with the output of a pump 16. The pump output line, or main supply line, 17 is connected with a directional valve 18. Also connected with the directional valve 18 is a main drain line 19, a first main intake and exhaust line 20, and a second main intake and exhaust line 20'. In the neutral or de-energized position of valve 18, i.e., the position illustrated in FIG. 2, the supply line 17 of pump 16 is not connected with either of lines 20 and 20', and the system is de-energized. When valve 18 is shifted to the right in FIG. 2 from the neutral position, the supply line 17 is connected with line 20, and the return line 19 is connected with line 20'. Conversely, when valve 18 is shifted to the left from the neutral position, as viewed in FIG. 2, the supply line 17 is connected with line 20', and the return line 19 is connected with line 20.

Line 20 is connected via a check valve 22 with one end of a supply line 23, the other end of line 23 being connected with a head end line 24 to the head end of actuator 6. The rod end of actuator 6 is connected with a rod end line 26. Similarly, line 20' is connected via a check valve 22' with a supply line 23' and a head end line 24' to the head end of actuator 6', the rod end of actuator 6' being connected with a rod end line 26'.

Actuation of the directional valve 18 to the right or left from the neutral position shown in FIG. 2 energizes the hydraulic circuit 15 to supply fluid either to the head end of actuator 6 or to the head end of actuator 6'. When valve 18 is actuated to the right in FIG. 2, fluid is supplied to the head end of actuator 6 and to the rod end of actuator 6' resulting in clockwise swinging movement of the swing bracket 2. Conversely, actuation of valve 18 to the left in FIG. 2 causes fluid to be supplied from pump 16 to the head end of actuator 6' and rod end of actuator 6 which results in counterclockwise swinging movement of the swing bracket 2.

When fluid pressure is supplied to the head end of one of the actuators 6 or 6', the actuator is urged to extend by the head end fluid pressure. Conversely, when fluid pressure is supplied to the rod end of one of the actuators 6 or 6', the rod end fluid pressure urges the actuator to retract. However, when one of the actuators is in an overcenter position with respect to the axis of support member 4 so that its line of force is on the same side of support member 4 as that of the other actuator, the swing bracket will prevent movement of the actuator in the direction urged by the fluid pressure acting on the actuator until the actuator moves from the overcenter position to the opposite side of the swing axis, i.e. the axis of the swing bracket support member 4.

A cross line 30 extends between lines 20 and 20', and lines 26 and 26' are connected with the cross line 30 through rod end drain lines 27 and 27'. Lines 24 and 24' are connected with the cross line 30 through head end drain lines 28 and 28'. Line 26 is connected with line 20' by a rod end intake line 32 bypassing line 27 and controlled by a check valve 34. Similarly, line 26' is connected with line 20 by a rod end intake line 32' controlled by a check valve 34' and bypassing line 27'. A first exhaust check valve 36 is located in line 30 between its connection with line 20 and its connection with line 28. Similarly, a second exhaust check valve 36' is located in line 30 between its connection with line 28' and its connection with line 20'.

The flow to the head end of motor 6 through line 24 is controlled by a normally open pressure reducing valve 38 which limits the pressure in line 24 to a predetermined maximum by closing to shut off flow to line 24 from line 23 when the predetermined maximum pressure exists in line 24. The pressure reducing valve 38 is controlled by a pilot pressure in a pilot line 40 connected with line 28 so as to sense the pressure at the head end of actuator 6. When line 20 is connected with the supply line 17, the pressure reducing valve 38 begins to meter the flow to line 24 when the pressure approaches a predetermined maximum, and shuts off the flow to line 24 when the pressure, as sensed through the pilot line 40, exceeds the predetermined maximum pressure. A similar pressure reducing valve 38' controls the pressure of hydraulic fluid to the head end of actuator 6' through line 24'.

Line 27 is controlled by a normally closed rod end metering valve 42. Valve 42 is connected through a pilot line 44 with line 26, and through a pilot line 46 with line 20. If the pressure in the pilot lines 44 or 46 reaches a predetermined value to overcome the spring force biasing valve 42 to its closed position, valve 42 will begin to open and permit flow from the rod end of actuator 6 through lines 26 and 27 to line 30.

Line 28 is controlled by a normally closed head end metering valve 48 having a pilot line 50 connected with line 28 so as to sense the pressure at the head end of actuator 6, and a pilot line 52 connected with line 32 at a point indicated by reference numeral 53 between the check valve 34 and the connection between line 32 and line 20'. When a predetermined pressure is reached in either of pilot lines 50 or 52, the valve 48 overcomes the spring force biasing it to a closed position and begins to open and permit flow through line 28 past valve 48 to line 30 from line 24.

Similar metering valves 42' and 48' control lines 26' and 28', respectively.

To extend actuator 6, the first metering valve 42 opens in response to the resulting increase in pressure in line 20, as sensed in the pilot line 46, to a predetermined amount sufficient to overcome the spring of valve 42. Valve 42 remains closed until the pressure in line 20 reaches the predetermined amount. Check valve 34 prevents flow through line 32 from the rod end of actuator 6.

When the directional valve 18 is manually actuated to connect line 20' with the pump supply line 17, pressure is supplied to the head end of actuator 6' and to the rod end of actuator 6. If neither actuator 6 nor actuator 6' is in an overcenter position, actuator 6' will extend due to the head end pressure, and actuator 6 will contract due to the rod end pressure. Contraction of actuator 6 causes fluid to flow from the head end of the actuator 6 through line 24 to line 28, and past valve 48 when the pilot pressure, as sensed in line 28 by pilot line 52, is sufficient to overcome the spring of valve 48. During contraction of actuator 6, fluid flows to the rod end of actuator 6 through line 26 from line 32.

Valve 48 functions to prevent overrunning when actuator 6 contracts. Valve 48 is biased by its spring to a closed position to shut off flow through line 28 when the pressure in line 32, as sensed by pilot line 52, drops below a predetermined level. If the pressure in line 32 reaches, or approaches, a predetermined level, valve 48 will begin to open due to the resulting rise in pressure in pilot line 52 in opposition to the force of the spring urging valve 48 to a closed position. If an overrunning condition occurs, pressure in line 32 will drop below a predetermined mimimum level, and the force of the spring acting on valve 48 will begin to close valve 48. The closing of valve 48 is resistant to contraction of actuator 6 to assist in the control of the movement of the swing bracket.

The metering valve 42 assits in the control of the movement of the swing bracket primarily when the actuator 6 extends. Valve 42 attempts to maintain a minimum pressure in line 26, and hence at the rod end of actuator 6 during extension of actuator 6. Valve 42 is biased to a normally closed position shutting off flow from line 26 to line 27 by a spring. The closing force of the spring on valve 42 is resisted by pressure in pilot line 46. Increases in the pressure in line 20 will cause an increase in the pressure in pilot line 46 which will tend to urge valve 42 to an open position against the force of the spring. Valve 42 will be closed by its spring force when the pressure in line 20 as sensed by pilot line 46 is below a predetermined minumum pressure. Therefore, as line 20 is pressurized tending to cause actuator 6 to extend, valve 42 will begin to open but maintains a minimum of resistance as the actuator 6 extends to prevent the pressure in line 20 from dropping below a predetermined minimum to assist in the control of movement of the swing bracket. The check valve 34 in intake line 32 prevents flow through line 32 from the rod end of actuator 6 during extension of actuator 6.

Line 30 is connected by a line 60 with the sump. Cavitation is prevented at the rod end of actuator 6 during contracting movement of actuator 6 by the flow of fluid from the sump through line 60 to line 30, past check valve 36' to line 20', and from line 20' through line 32 past check valve 34 to line 26. Similarly, cavitation is prevented at the rod end of actuator 6' during contracting movement of actuator 6' by the suction of fluid from the sump through line 60 to line 30 past check valve 36 to line 20, and from line 20 through line 32' past check valve 34' to line 26'.

Cavitation at the head end of actuator 6 during extending movement thereof is prevented by the suction of fluid from the sump through line 60 to line 30, and from line 30 past check valve 36 to line 20, and from line 20 past check valve 22 to line 24. Cavitation at the head end of actuator 6' during extending movement thereof is prevented by the suction of fluid from the sump through line 60 to line 30, past check valve 36' to line 20', and past check valve 22' to line 24'.

The pins 14 and 14' move in a circular path about the axis of the swing bracket support member 4. The circular path of pins 14 and 14' is indicated in phantom lines in the drawings and is designated by reference numeral 63. The longitudinal axis of the vehicle is indicated by reference numeral 61 in the drawings, which longitudinal axis intersects the axis of rotation of the swing bracket 2, namely, the axis of the support member 4. The swing bracket 2 is illustrated in its central position in the full line position of FIG. 1, in which central position the pins 14 and 14' are spaced an equal distance from the longitudinal axis 61 (as well as the axis of swing bracket support member 4) and on opposite sides thereof.

With reference primarily to FIG. 2, three positions of pin 14' on the circular path 63 are indicated at *a*, *b*, and *c*. Position *a* is the position of rod 12' (indicated in FIG. 2 at 12'-*a*) in which the swing bracket is in the central position illustrated in full lines in FIG. 1. Position *b* is the position rod 12' (indicated by reference numeral 12'-*b* in FIG. 2) in which the longitudinal axis of rod 12' (and hence the line of force of actuator 6') intersects the axis of rotation of the swing bracket 2, or the vertical axis of the swing bracket support member 4. Position *c* is the position on the circular path 63 of pin 14' in which the swing bracket is in its extreme, clockwise position, the phantom line position illustrated in FIG. 1.

To actuate the swing bracket 2 from the central position shown in full lines in FIG. 1 to the extreme, counterclockwise position shown in phantom lines in FIG. 1 (the full line position of FIG. 2) in which the swing bracket is rotated 90° from its central position, the directional valve 18 is actuated toward the left in FIG. 2 to connect line 20' with line 17, and simultaneously connect line 20 with the return line 19. Fluid pressure is applied to the head end of actuator 6' through line 24', and to the rod end of actuator 6 through line 26. As rod 12' extends, then 14' moves from position *a* on the circular path 63 toward position *b*. During the time that rod 12' moves from the position indicated at 12'-*a* to the position illustrated at 12'-*b*, the actuator 6' applies a counterclockwise moment on the swing bracket 2. When the rod 12' reaches position 12'-*b* extending across the axis of rotation of the swing bracket 2, the moment arm of rod 12' is zero. When rod 12' moves over center with pin 14' moving from position *b* toward position *c*, the moment arm of rod 12' is such that actuator 6' urges the swing bracket 2 to rotate in a clockwise direction in opposition to actuator 6. During the counterclockwise rotation of swing bracket 2 from the central position shown in full lines in FIG. 1, the moment arm applied by actuator 6 increases to a maximum at the extreme counterclockwise position of the swing bracket 2 illustrated in phantom lines in FIG. 1 and in full lines in FIG. 2. In the extreme counterclockwise position of the swing bracket 2, the line of force of the actuator 6 is tangent to the circular path 63, and the moment arm is equal to the radius R of the circular path 63. Thus, the counterclockwise torque applied by actuator 6 to the swing bracket 2 increases during the counterclockwise rotation of the swing bracket 2 from the central position to a maximum when the swing bracket 2 reaches the extreme counterclockwise position illustrated in FIG. 2, or the position located at 90°, clockwise from the central position. The counterclockwise torque applied by actuator 6 is at a maximum in the position shown in FIG. 2 because (1) the resultant force along rod 12 is tangent to the circular path 63, and (2) the moment arm of the resultant force is equal to the radius R, which is the maximum length of the moment arm applied by the actuator 6 to the swing bracket 2 during counterclockwise rotation of the swing bracket 2 from the central position.

Thus, the torque applied by actuator 6' to the swing bracket 2 during counterclockwise rotation of the swing bracket 2 from the central position, augments the torque applied by actuator 6 until actuator 6' moves over center with respect to the axis of rotation of the swing bracket. After the actuator 6' moves overcenter, the torque applied by actuator 6' is in opposition to the torque applied by actuator 6. However, in all positions of the swing bracket between the central position and the extreme counterclockwise position shown in FIG. 2, the net torque applied by actuator 6 and 6' is in a counterclockwise direction; the counterclockwise torque applied by actuator 6 is always greater than the clockwise torque applied by actuator 6' after actuator 6' moves overcenter. As a result of the overcenter movement of actuator 6', a more uniform net torque is applied to the swing bracket 2 throughout its movement from the central position to the extreme counterclockwise position; the increasing magnitude of the counterclockwise torque applied by actuator 6 during counterclockwise movement of the swing bracket is offset by increasing clockwise torque applied by actuator 6' during the time that actuator 6' is overcenter and swing bracket 2 moves counterclockwise.

Actuator 6' functions as a motor during counterclockwise rotation of the swing bracket 2 as rod 12' moves from position 12'-*a* to position 12'-*b*. As the rod 12' moves overcenter, actuator 6' functions as a pump forcing fluid to flow from the head end of actuator 6' through line 24' against the pressure of the fluid flowing into line 20' from pump 16. When actuator 6' is in its pump mode of operation, valve 48' functions as a relief valve because the pressure in line 28' is sensed by pilot line 50', the pressure in pilot line 50' causing valve 48' to open and permit flow through line 28' past valve 48' into line 30, and from line 30 through line 60 to sump. Valve 48' moves to its open position when the pressure in line 28', as sensed by pilot line 50', is slightly greater than the pressure required to close valve 38'.

To return swing bracket 2 in a clockwise direction from the position shown in FIG. 2 and in phantom lines in FIG. 1, the directional valve 18 is actuated toward the right from the neutral position shown in FIG. 2 to connect line 20 with line 17, and line 20' with line 19. Pressure is applied to the head end of actuator 6 and to the rod end of actuator 6'. Since actuator 6' is still in the overcenter position, clockwise movement of swing bracket 2 causes extension of actuator 6' even through fluid pressure is applied through line 26 to the rod end of actuator 6' urging the actuator to retract. Consequently, actuator 6' applies a counterclockwise torque to the swing bracket 2 in opposition to the clockwise torque applied by actuator 6 during extension of actuator 6. The clockwise torque applied by actuator 6 is at a maximum in the position shown in FIG. 2 when pressure is applied to the head end of actuator 6. The torque applied by actuator 6 decreases as the swing bracket 2 moves clockwise from the position of FIG. 2, and simultaneously, the counterclockwise torque applied by the overcenter actuator 6' decreases as the swing bracket moves clockwise until actuator 6' moves to the center position with rod 12' located at position 12'-*b* in FIG. 2. As the pin 14' moves past position *b* toward position *a*, the torque applied by actuator 6' reverses from counterclockwise to a clockwise direction to augment the clockwise torque applied by actuator 6. Again, during the time that actuator 6' is in the overcenter position with pin 14' located between positions *c* and *b* on the path 63, it functions in a pump mode of operation forcing fluid through line 26' from the rod end of actuator 6' against the pressure from the pump in line 32'. Valve 42' operates as a relief valve to permit flow from line 26' to line 27' past valve 42', valve 42' opening in response to pressure sensed in line 26' and line 32' by pilot line 44'.

The actuators 6 and 6' can be considered to cooperate with the swing bracket 2 and swing bracket support member 4 to form a quadrilateral control linkage that actuates the swing bracket 2 with respect to the swing bracket support member 4. The quadrilateral control linkage is indicated diagrammatically in phantom lines in FIG. 1 and has leg *j* and *l* of fixed length and legs *k* and *m* of variable lengths. Leg *j* extends between the pivotal support members 10 and 10' of the actuators 6 and 6', and leg *l* extends between the pins 14 and 14' on the swing bracket 2. Legs *k* and *m* are provided by the rods 12 and 12' of the actuators, or the lines of action thereof. In the central or full line position of the swing bracket at FIG. 1, the quadrilateral control linkage *j, k, l, m*, has a trapezoidal configuration with legs *k* and *m* being of equal length. As the swing bracket 2 rotates 90° to the phantom line position in FIG. 1, leg *k* increases its length and leg *m* decreases its length so that the quadrilateral control linkage *j, k, l, m*, moves into a trapezium configuration in the phantom line position of the swing bracket 2 in FIG. 1. In FIG. 1, pivot pins 10 and 10' are spaced apart a distance D. Pivot pins 10 and 10' (and hence leg *j*) are spaced from the axis of support member 4 a distance E along the longitudinal axis 61, and the axis of support member 4 is spaced from pins 14 and 14' (and hence leg *l*) a distance F. Pins 14 and 14' are spaced apart a distance G, while pins 10 and 14, in the phantom line position of swing bracket 2 in FIG. 1 are spaced apart a distance H. In a specific embodiment of the invention, D is 178 millimeters; E is 209.5 millimeters; F is 156.66 millimeters; G is 169.0 millimeters; H is 142.09 millimeters. Referring to FIG. 2, R is 178 millimeters, and the actuators have a 4 inch bore with a 2¼ inch diameter rod. While the above dimensions were found to be operative on an actual test of a model of the above embodiment, it is to be understood that other configurations, particularly variations of the above dimensions as well as actuator size could be used by proper adaption of the pressure settings of the hydraulic components to balance the torque on the swing bracket 2.

Valves 42, 42' and 48, 48' can function as relief valves when the directional valve 18 is returned from its actuated to the neutral position illustrated in the drawings, with line 30 being connected through line 60 to sump. Valves 48 and 48', for example, may be set to open when the head end pressure, as sensed by pilot lines 50 and 50', reaches approximately 2200 psi. Valves 42 and 42', may, for example, be set to open when the pressure in lines 26 and 26', as sensed by pilot lines 44 and 44', reaches a predetermined maximum such as 3500 psi. The foregoing specific pressures are given by way of example only, and are not to be construed as limitations. It is apparent that the pistons of the actuators 6 and 6' have differential areas on their head end and rod end sides, the effective area on the rod end side being reduced by the area of the rods 12 and 12'. The specific differential areas between the head and rod side of the actuator piston must therefore be taken into account to obtain a constant force and enable the swing bracket 2 to return on the same torque curve that it is initially swung on. The resulting torque curve has a torque value that is substantially the same for a given swing bracket 2 position regardless of the direction of travel of the swing bracket 2. The above curve is accomplished by compensating the pressure on the head side of the extending actuator 6 or 6' to obtain a head side force matching the force of the rod side. This applies to both actuators, and results from a pressure reduction in the powering mode and a pressure relief in the pumping mode.

The system of this invention provides improved torque control and reduced peak torque loads. The pressure is controlled in the system in all operating conditions to minimize the occurrence of conditions that are favorable to cavitation. Smooth torque control is provided when the system is energized to swing the swing bracket, and external shock loads are relieved by the valves 42, 42', 48 and 48' to prevent the occurrence of excessive pressures in the system from such external shock loads.

An advantage of the present system is that, for a given setting of the directional valve, the velocity of the swing bracket 2 is reduced at the end positions prior to any cushioning. Since the flow for a given directional valve setting is constant the velocity can only be varied where one actuator (the one acting as a pump) dumps to sump to reduce the flow and slow the swing. This is accomplished by a metering valve, for example, valve 42' for actuator 6' in position *c* of FIG. 2 for clockwise motion.

While the invention has been described specifically in connection with backhoe swing apparatus, it is apparent that the invention is suitable for other uses, and particularly with other apparatus having a swinging boom. Therefore, terms and phrases, such as "backhoe" and "backhoe swing apparatus" as used herein, mean any such apparatus having a boom, or the like, that is normally hydraulically operated.

While a specific embodiment of the invention has been illustrated and described in the foregoing specification and accompanying drawings, it should be understood that the invention is not limited to the exact construction shown, but that various alterations in the construction and arrangement of parts is possible without departing from the scope and the spirit of the invention.

I claim:

1. Backhoe swing apparatus comprising: a swing bracket support member; a backhoe swing bracket mounted on said swing bracket support member for side-to-side swinging movement with respect thereto; hydraulic power means connected with said swing bracket for causing said swing bracket to swing in opposite directions with respect to said swing bracket support member in response to flow of hydraulic fluid in opposite directions to and from said hydraulic power means; and a hydraulic system for controlling flow to and from said hydraulic power means, said hydraulic system including: at least one pair of hydraulic lines for conducting hydraulic fluid to and from said power means, said swing bracket being actuated to swing in one direction when fluid flows to said power means through one of said lines and in the opposite direction when fluid flows to said power means in the other of said lines, a pressure reducing valve controlling one of said hydraulic lines and operable to limit pressure to said power means through said one hydraulic line to a predetermined maximum pressure, a first metering valve operable to permit flow of hydraulic fluid from said power means through said other hydraulic line only when a predetermined minimum pressure exists in one of said hydraulic lines during swinging movement of said swing bracket in said one direction, and a second metering valve operable to permit flow of hydraulic fluid from said power means through said one hydraulic line during swinging movement of said swing bracket in the opposite direction when hydraulic fluid flows to said power means through said other hydraulic line only when a predetermined minimum pressure exists in said one of said hydraulic lines.

2. Apparatus as claimed in claim 1 wherein said power means comprises at least one piston and cylinder actuator extensible and contractable in response to flow of hydraulic fluid to and from said actuator.

3. Apparatus as claimed in claim 2 wherein said one hydraulic line is connected with the head end of said actuator and said other hydraulic line is connected with the rod end of said actuator.

4. Apparatus as claimed in claim 3 further including a supply line connected with said one hydraulic line, said pressure reducing valve being mounted in said supply line to control pressure in said one hydraulic line.

5. Apparatus as claimed in claim 4 further including a head end drain line connected with said one hydraulic line and bypassing said supply line, said second metering valve being mounted in said head end drain line to control the flow therethrough.

6. Apparatus as claimed in claim 5 further including a rod end drain line connected with said other hydraulic line, said first metering valve being mounted in said rod end drain line to control the flow therethrough.

7. Apparatus as claimed in claim 6 further including a rod end intake line connected with said other hydraulic line, said rod end intake line bypassing said rod end drain line, and a check valve in said rod end intake line permitting flow to the rod end of said actuator through said rod end intake line, but preventing flow from the rod end of said actuator through said rod end intake line.

8. Apparatus as claimed in claim 7 further including a check valve in said supply line permitting flow to the head end of said actuator through said supply line, but preventing flow from the head end of said actuator through said supply line.

9. Apparatus as claimed in claim 8 further including a first main intake and exhaust line connected with said supply line, a second main intake and exhaust line connected with said rod end intake line, a cross line connecting said first and second main intake and exhaust lines, a first exhaust check valve permitting flow from said cross line to said first main intake and exhaust line but preventing flow to said cross line from said first main intake and exhaust line, and a second exhaust check valve permitting flow from said cross line to said second main intake and exhaust line but preventing flow to said cross line from said second main intake and exhaust line, said head end drain line and rod end drain line being connected with said cross line between said first and second exhaust check valves.

10. Apparatus as claimed in claim 1 wherein said pressure reducing valve is biased to a normally open position, said pressure reducing valve having a pilot line connected to sense the pressure in said one hydraulic line down stream of said reducing valve and being responsive to a predetermined maximum pressure to move to a closed position from said normally open position.

11. Apparatus as claimed in claim 1 wherein said first metering valve is biased to a normally closed position, and is responsive to a predetermined pressure in said one hydraulic line to move to an open position from said normally closed position.

12. Apparatus as claimed in claim 1 including a first pilot line for said first metering valve connected with said one hydraulic line, and a second pilot line for said first metering valve connected to sense the pressure in said other hydraulic line.

13. Apparatus as claimed in claim 1 wherein said second metering valve is biased to a normally closed position, and is responsive to a predetermined pressure in said other hydraulic line to move to an open position from said normally closed position.

14. Apparatus as claimed in claim 1 including a first pilot line for said second metering valve connected to sense pressure in said other hydraulic line, and a second pilot line for said second metering valve connected to sense pressure in said one hydraulic line.

15. Swing apparatus for backhoes and the like comprising: a swing bracket support member; a swing bracket mounted on said swing bracket support member for side-to-side swinging movement with respect thereto; hydraulic power means connected with said swing bracket for causing said swing bracket to swing in opposite directions with respect to said swing bracket support member in response to flow of hydraulic fluid in opposite directions to and from said hydraulic power means; and a hydraulic system for controlling flow to and from said hydraulic power means, said hydraulic system including: at least one pair of hydraulic lines for conducting hydraulic fluid to and from said power means; said swing bracket being responsive to flow of hydraulic fluid to said power means in one of said lines to swing in one direction, and responsive to flow of hydraulic fluid to said power means in the other of said lines to swing in the opposite direction; a pressure reducing valve through which all flow in said one hydraulic line passes to said power means for controlling said one hydraulic line, said pressure reducing valve being operable to limit pressure to said power means to a predetermined maximum pressure by restricting flow through said one hydraulic line; and a metering valve operable to permit flow of hydraulic fluid from said power means through said other hydraulic line during said swinging movement of said swing bracket only when a predetermined minimum pressure exists in one of said hydraulic lines.

16. Apparatus as claimed in claim 15 wherein said metering valve is operable only when a predetermined minimum pressure exists in said one hydraulic line.

17. Apparatus as claimed in claim 15 wherein said pressure reducing valve is biased to a normally open position, said pressure reducing valve having a pilot line connected to sense the pressure in said one hydraulic line down stream of said pressure reducing valve and being responsive to a predetermined maximum pressure in said one hydraulic line down stream of said pressure reducing valve to move to a closed position from said normally open position.

18. Apparatus as claimed in claim 15 wherein said metering valve is biased to a normally closed position, and is responsive to a predetermined pressure in one of said hydraulic lines to move to an open position from said normally closed position.

19. Apparatus as claimed in claim 18 wherein said metering valve is responsive to a predetermined pressure in said one hydraulic line.

20. A hydraulic system for operating backhoe swing apparatus and the like comprising: a pair of hydraulic lines; a normally open pressure reducing valve controlling one of said hydraulic lines and operable to limit pressure in said one hydraulic line to a predetermined maximum pressure, a first normally closed, metering valve controlling said other hydraulic line and operable to permit flow of hydraulic fluid through said other hydraulic line only when a predetermined minimum pressure exists in said one hydraulic line in response to said flow in said one direction through said one hydraulic line, a second normally closed, metering valve operably to control flow of hydraulic fluid in the opposite direction through said one hydraulic line only when a pedetermined minimum pressure exists in said other hydraulic line; and check valve means for preventing flow through said pressure reducing valve in said opposite direction.

21. Apparatus as claimed in claim 1 including first and second pilot lines and first and second check valves and wherein said one line also includes as a portion thereof supply and intake and exhaust lines and said other line also includes as a portion thereof rod end intake and intake and exhaust lines, said first check valve connecting said supply line to said intake and exhaust line, said first pilot line connected to said intake and exhaust line, said second check valve in said rod end intake line, said rod end intake line connecting said intake and exhaust line to said other line and said second pilot line connected to the same line side of said second check valve as said intake and exhaust line.

22. Apparatus as claimed in claim 1 wherein said one line includes as a portion thereof a supply and intake and exhaust lines and a check valve, said check valve in the connection between said supply line and intake and exhaust line including a pilot line for said metering valve connected with said intake and exhaust line.

* * * * *